(12) United States Patent
Kritzer

(10) Patent No.: US 9,212,745 B2
(45) Date of Patent: Dec. 15, 2015

(54) SEALING FRAME FOR CELLS IN A BATTERY WITH A THERMALLY ACTIVE COMPENSATING ELEMENT

(75) Inventor: Peter Kritzer, Forst (DE)

(73) Assignee: Carl Freudenberg KG, Weinheim (DE)

( * ) Notice: Subject to any disclaimer, the term of this patent is extended or adjusted under 35 U.S.C. 154(b) by 941 days.

(21) Appl. No.: 12/872,350

(22) Filed: Aug. 31, 2010

(65) Prior Publication Data
US 2011/0003185 A1 Jan. 6, 2011

Related U.S. Application Data

(63) Continuation of application No. 12/823,740, filed on Jun. 25, 2010, now abandoned.

(30) Foreign Application Priority Data

Jul. 6, 2009 (EP) .................................... 09008802
Dec. 17, 2009 (EP) .................................... 09015636

(51) Int. Cl.
| | |
|---|---|
| F16J 15/06 | (2006.01) |
| F16J 15/12 | (2006.01) |
| H01M 10/04 | (2006.01) |
| H01M 10/615 | (2014.01) |
| H01M 10/647 | (2014.01) |
| H01M 10/6557 | (2014.01) |
| H01M 10/6554 | (2014.01) |
| H01M 10/613 | (2014.01) |

(52) U.S. Cl.
CPC .............. *F16J 15/064* (2013.01); *F16J 15/122* (2013.01); *H01M 10/0413* (2013.01); *H01M 10/613* (2015.04); *H01M 10/615* (2015.04); *H01M 10/647* (2015.04); *H01M 10/6554* (2015.04); *H01M 10/6557* (2015.04)

(58) Field of Classification Search
None
See application file for complete search history.

(56) References Cited

U.S. PATENT DOCUMENTS

| | | | |
|---|---|---|---|
| 5,521,024 A | 5/1996 | Sasaki et al. | |
| 2003/0031925 A1* | 2/2003 | During | 429/162 |
| 2006/0063066 A1* | 3/2006 | Choi et al. | 429/120 |
| 2007/0269714 A1* | 11/2007 | Watanabe et al. | 429/120 |
| 2008/0118821 A1* | 5/2008 | Gehring et al. | 429/92 |
| 2009/0258288 A1* | 10/2009 | Weber et al. | 429/120 |

FOREIGN PATENT DOCUMENTS

| | | |
|---|---|---|
| CN | 101180750 B | 6/2010 |
| CN | 1992381 B | 4/2011 |
| DE | 102008041475 A1 | 2/2009 |
| EP | 0339364 A2 | 11/1989 |

(Continued)

*Primary Examiner* — Alix Eggerding
(74) *Attorney, Agent, or Firm* — Harness, Dickey & Pierce, P.L.C.

(57) ABSTRACT

Sealing frame (1) for utilization in a battery, encompassing a base body (2) whereby the base body (2) encompasses an opening (3), whereby the base body (2) features a first sealing surface (4) and a facing second sealing surface (5) and whereby the first sealing surface (4) and/or the second sealing surface (5) are implemented elastically compressible. During normal operation, the frame provides an optimal operating temperature and a reliable leak tightness, in the event of failure however the frame permits the electrolyte to escape, effortlessly and directed, characterized by cooling passages (22) that are integrated in the base body (2) and/or a heating device (23) which interfuse the base body (2) at least partially along the lengthwise expansion of the sealing surfaces (4, 5).

25 Claims, 10 Drawing Sheets

(56) References Cited

FOREIGN PATENT DOCUMENTS

| | | | |
|---|---|---|---|
| EP | 1577966 | A3 | 9/2011 |
| FR | 2875057 | A1 | 3/2006 |
| JP | 09055217 | A | 2/1997 |
| JP | 2004014125 | A | 1/2004 |
| JP | 2005108693 | A | 4/2005 |
| JP | 2005268004 | A | 9/2005 |
| JP | 2005268029 | A | 9/2005 |
| JP | 2008103239 | A | 5/2008 |
| WO | 2005096412 | A1 | 10/2005 |

* cited by examiner

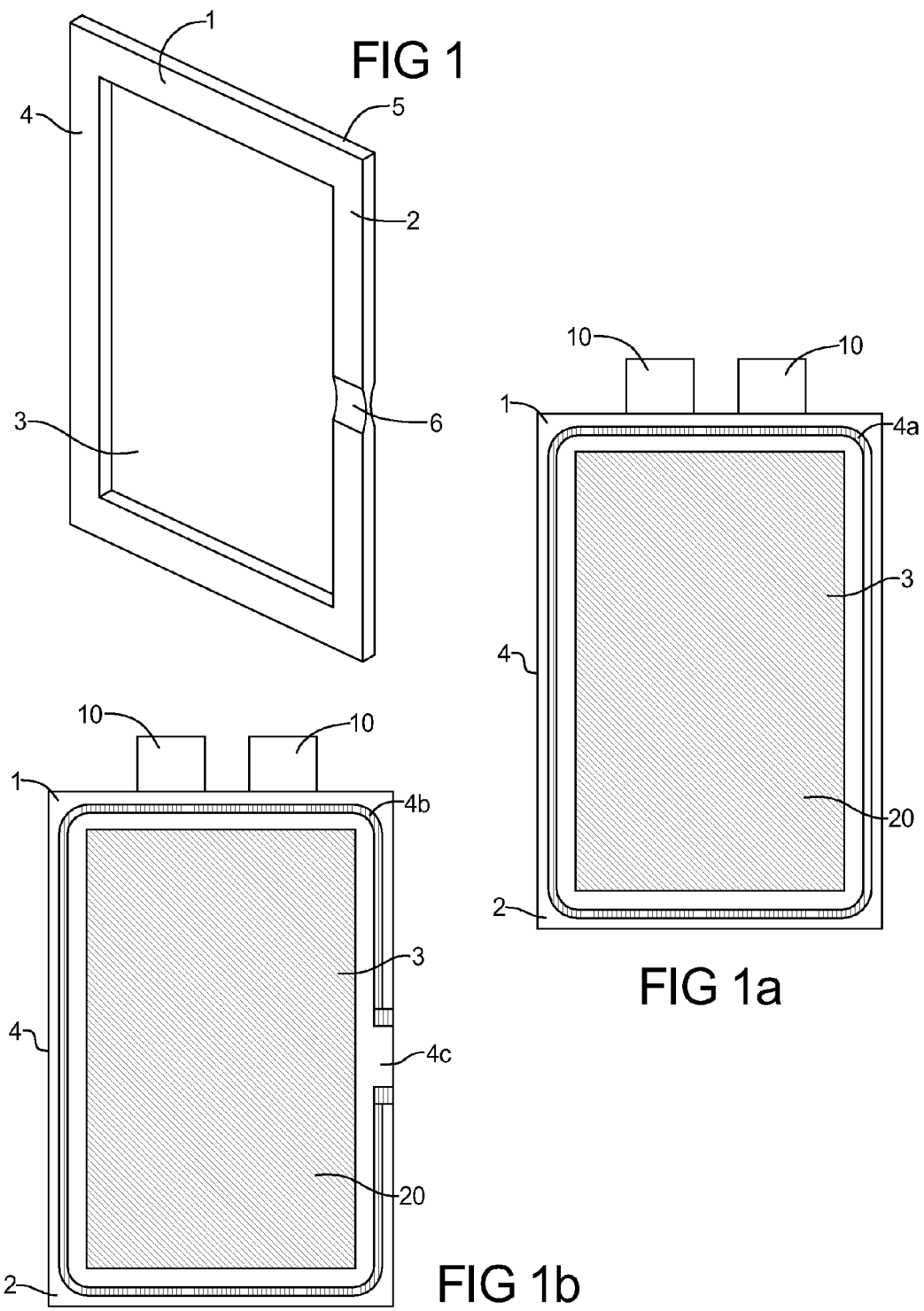

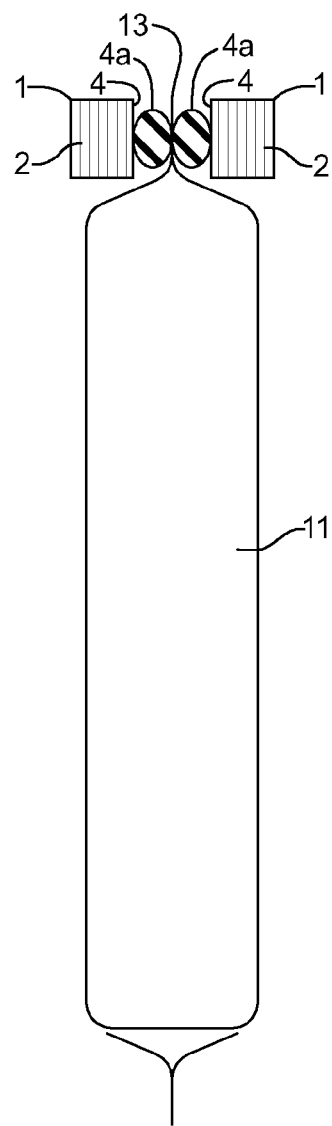
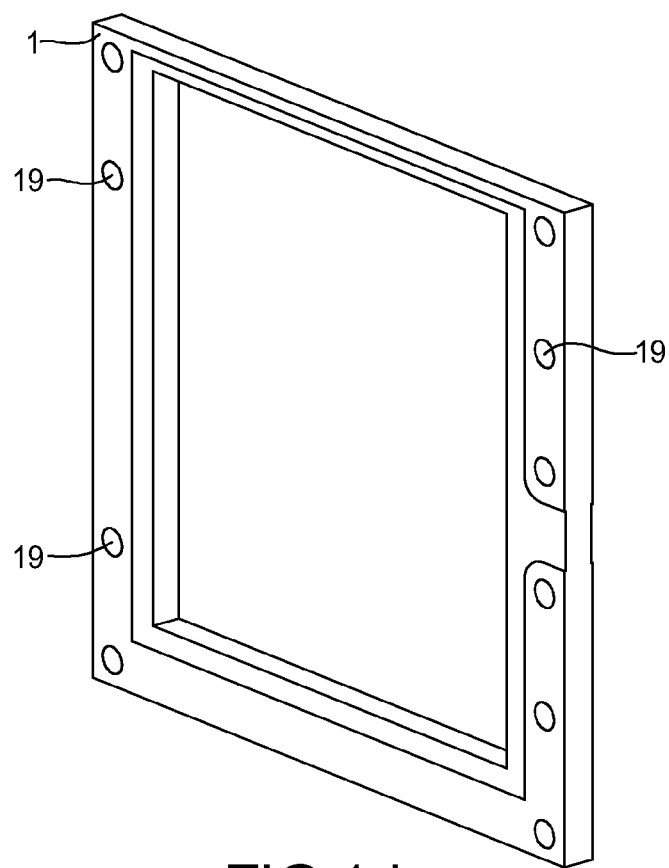
FIG 1c
FIG 1d

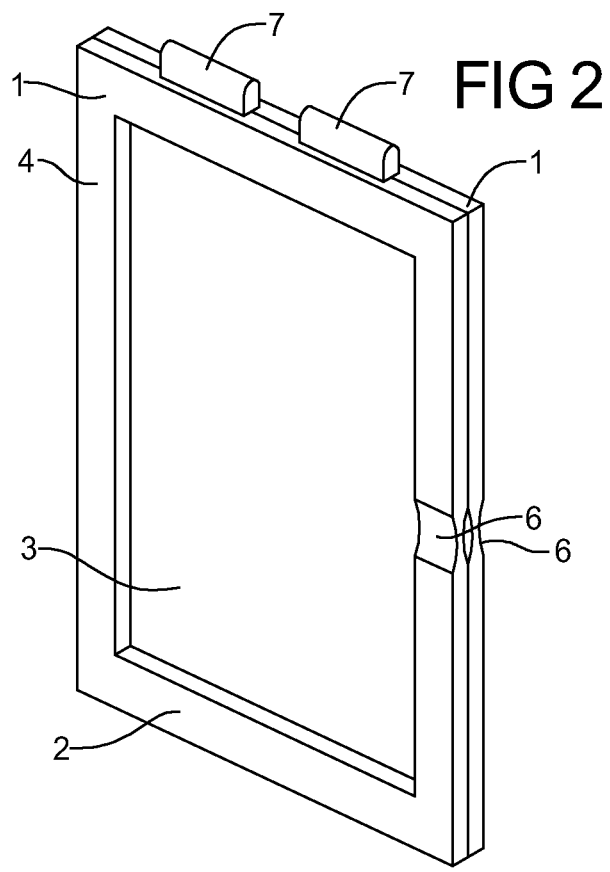
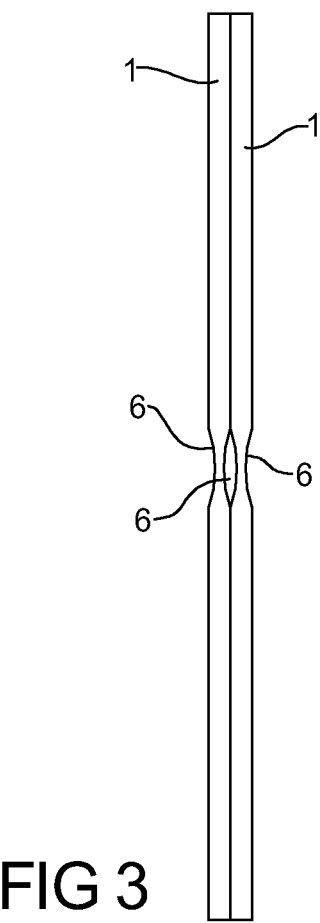
FIG 2
FIG 3

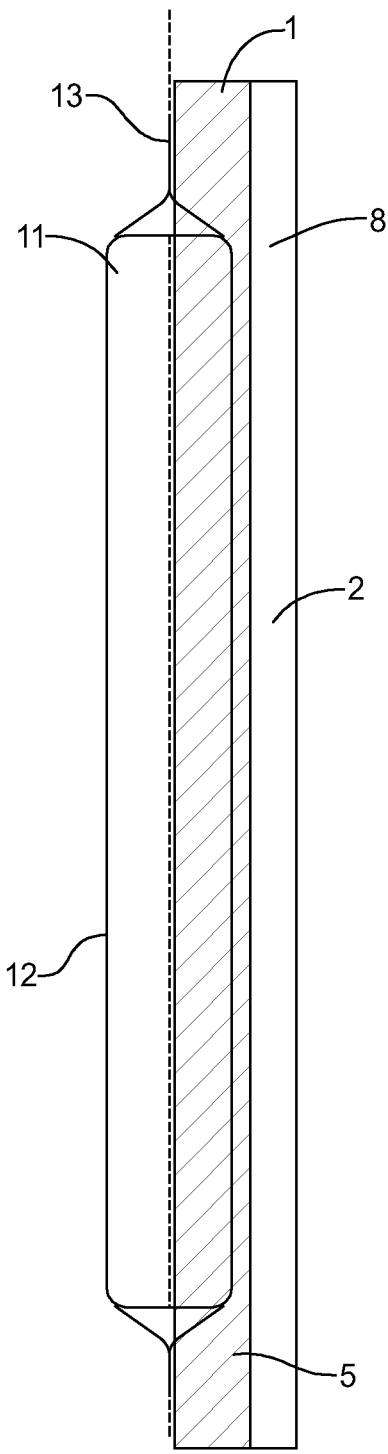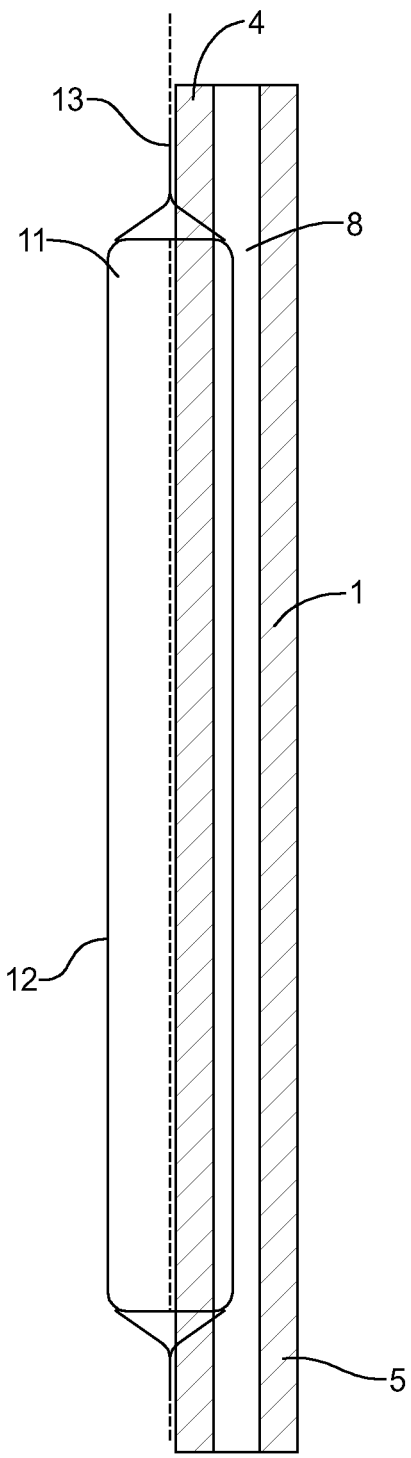

FIG 6
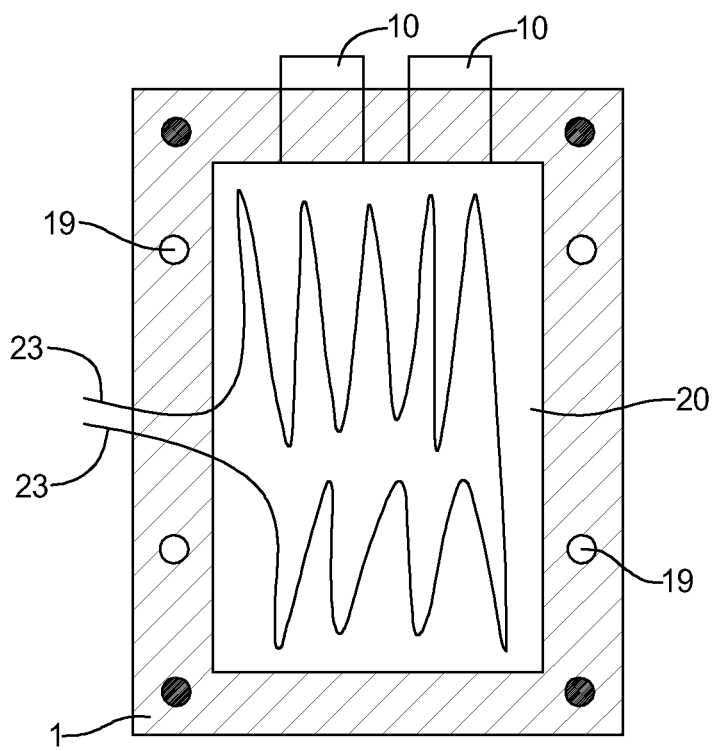
FIG 7
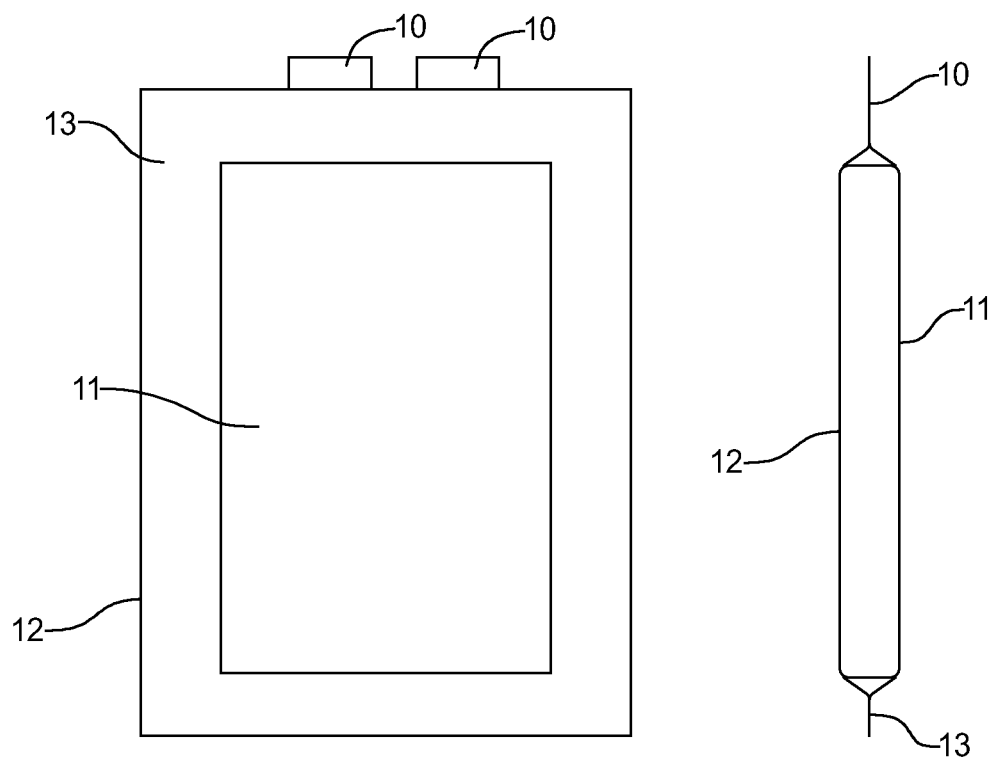
FIG 7a

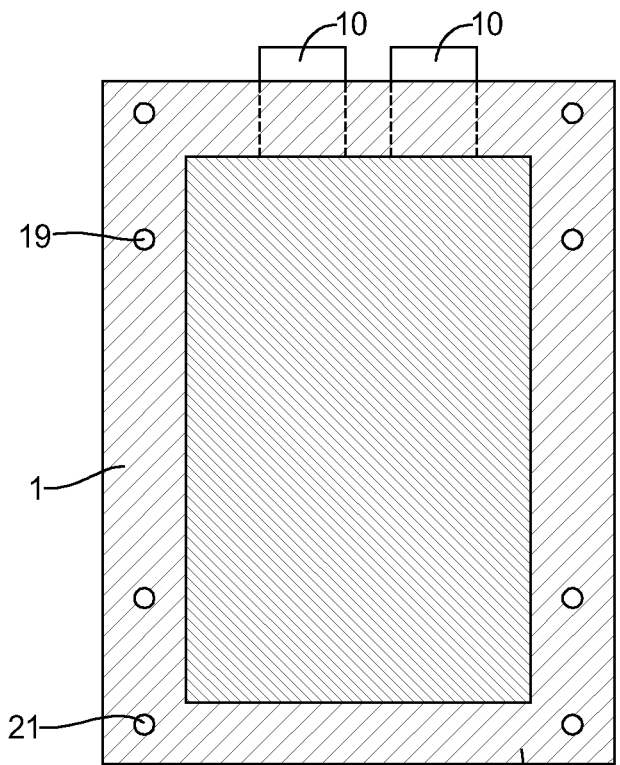
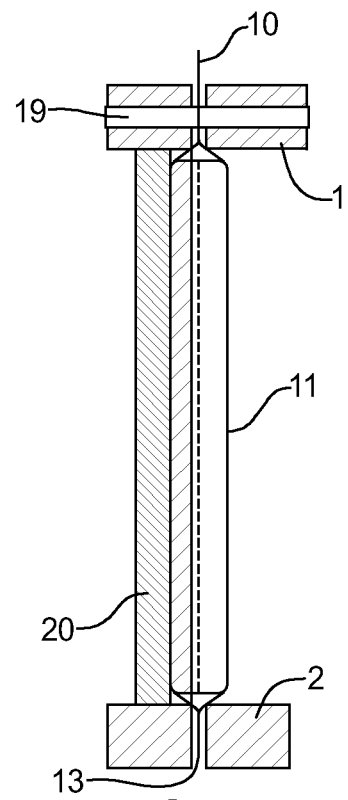
FIG 11
FIG 11a
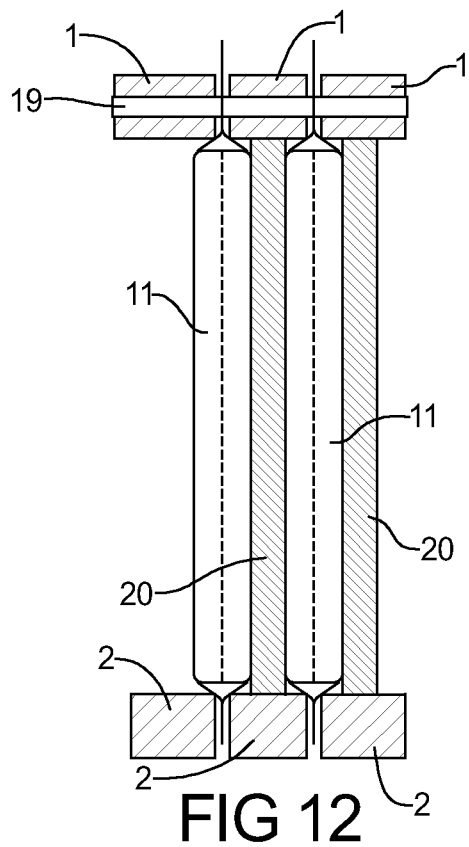
FIG 12

SEALING FRAME FOR CELLS IN A BATTERY WITH A THERMALLY ACTIVE COMPENSATING ELEMENT

CROSS-REFERENCE TO RELATED APPLICATIONS

This application is a contination of U.S. Ser. No. 12/823,740, filed Jun. 25, 2010, which claims the benefit and priority of EP09008802.2, filed Jul. 6, 2009 and EP09015636.5, filed Dec. 17, 2009. The entire disclosures of each of the above applications are incorporated herein by reference.

FIELD

The present disclosure relates to a sealing frame for utilization in a battery, encompassing a base body whereby the base body encompasses an opening, whereby the base body features a first sealing surface and a facing second sealing surface and whereby the first sealing surface and/or the second sealing surface are implemented elastically compressible.

BACKGROUND

This section provides background information related to the present disclosure which is not necessarily prior art.

Larger batteries are constructed from individual cells. Usually a battery for hybrid or electric vehicles or industrial applications contains between 20 and several hundred individual cells. The individual cells can thereby be implemented as round cells, as prismatic cells or as so-called Coffee-Bag-cells. Coffee-Bag cells encompass a flexible sleeve, which is made from foil, in which electrical components of the cell are disposed.

Primarily Coffee-Bag cells are used in a battery in order to realize an optimal spatial usage. These furthermore distinguish themselves through low weight with high capacity. Coffee-Bag cells can be cooled well by means of the thermally conductive foils.

Furthermore cells of this construction-type can be easily scaled as all components of the cell, including the foil housing, can be easily changed in size during production.

Because of the high amount of stored energy, larger batteries always represent a safety risk during the occurrence of error functions. In this context lithium batteries are to be viewed particularly critically because they feature a high energy density, a flammable electrolyte, and thin separators. Finally lithium batteries generate high cell voltages so that the components disposed within the cell are exposed to high electro-chemical loads. This is particularly relevant in the case of car and industrial batteries for which lifetimes of at least 8-10 years are scheduled.

The previously mentioned Coffee-Bag cells can be mounted in a space-saving manner. As a result, large amounts of energy can be stored per unit volume in a battery. With this are however substantial construction-driven disadvantages associated. Because of the flexible sleeve the dimension of the Coffee-Bag cells changes when these are charged or discharged. This is also associated with a volume expansion. The volume expansion leads to typical thickness changes of an individual cell of about 5% between charged and uncharged state.

During the assembly of a so-called "stack", which consists of many individual, switched in series, cells, one must take into account that the individual cells feature a variable volume. It is of particular importance that the cells in the charged state, in which they attain their largest thickness, exert next to no or only minimal pressure onto the surfaces of neighboring cells. In this context it has to be fundamentally considered that the thickness of the flexible cells is, because of manufacturing tolerances, not uniform but subject to variations.

Furthermore there is a need for an arrangement by means of which impacts or vibrations are cushioned and/or dampened so that the interior of the battery as well as contacts do not sustain damage. Furthermore connections of power or monitoring electronics must be connected to the battery for most part free of mechanical loading. A release of only one of the many hundred contacts of the power electronics leads, in the case of a serial circuit to the failure of the battery. In the case of a failure of a contact of the monitoring electronics, the no longer monitored battery can then gradually reach a critical state, which over the intermediate term can lead to the damage or the failure of the entire battery.

The edges of the previously mentioned Coffee-Bag cells feature a sealing seam. This sealing seam joins two foils of a cell which thereby enclose additional components in the hollow space created thereby. For this purpose these foils are coated on the interior side with an electrically isolating, adhesion-promoting seal thermoplastic. This seal thermoplastic can be created from a functionalized polyolefin. This sealing seam represents the mechanical weak point of a Coffee-Bag cell.

Furthermore the air pressure can vary in the surroundings of the cells. If the housing of the battery is hermetically sealed, temperature-dependent pressure variations of typically 0.2 bar can occur. These pressure variations further strain the sealing seams.

The sealing seam represents however also a break-off point that is supposed to provide the electrolyte the opportunity to blow off in the case of a failure of the battery. A bursting of the cell is to be avoided thereby.

If the leaking flammable electrolyte comes in contact with electrodes, it can ignite and lead to fires or explosions. The maximally permitted overpressures in the interior of a Coffee-bag cell are usually significantly less than 0.1 MPa in order to prevent an opening of the sealing seam. The implementation of the current conducting electrodes has to be viewed particularly critically in the case of Coffee-Bag cells. These feature most often a thickness of about 0.1 to 0.3 mm. In this area a possible leakage is particularly critical because leaking electrolyte can instantly ignite at the electrodes. The sealing seam is generally seen as the weak spot of larger cells because it is exposed over years to constant stresses due to cycling.

Finally preferably water-based cooling media are currently used for the cooling of large batteries or, in the context of application with climate-control installation, fluorinated hydrocarbons or carbon dioxide. A direct contact of most cooling media with the interior of the cells can lead to violent chemical reactions. In the case of water-based cooling media hydrogen is for example released, which is easily flammable and can lead to explosions. It is for this reason that a contact cooling is usually employed in the technology, whereby the heat flow between cell and cooling circulation is established via thermally conductive components and the cooling medium as a result does not come into direct contact with the cells.

SUMMARY

This section provides a general summary of the disclosure, and is not a comprehensive disclosure of its full scope or all of its features.

It is therefore the object of the disclosure to design and further improve a battery in such a way that it exhibits, during normal operation, an optimal operating temperature and a reliable sealing, during failures however permits the electrolyte to escape without problem and in a directed manner.

Accordingly a sealing frame of the type mentioned above is characterized by a cooling means and/or heating means that is integrated in the base body and which interfuse the base body at least partially along the lengthwise expansion of the sealing surfaces.

According to the disclosure it has been realized that elastically compressible sealing surfaces can tightly encompass and overlap a break-off point, such as a sealing seam, By means of such sealing frame, the cells within a battery are on the one hand mechanically fixed and can on the other hand alter their volume slightly within the target range of the front and back side without loading tensions arising. The elastically compressible sealing surfaces compensate for a slight volume change of the cells without a problem so that no mechanical stresses are transferred to the electrical connections. Furthermore elastically compressible sealing surfaces can dampen and cushion the vibrations. The weak point of a cell is sealed in addition because it is subject to an elastic contact pressure. A leaking of electrolyte from the interior to the exterior is hereby strongly suppressed. Furthermore, cooling media that are pooling outside, particularly water or moisture that is pooling from the surroundings, are kept away from the interior of the battery. Furthermore, it has been recognized that a control release location can be effortlessly installed in an elastically compressible sealing surface which, in a failure, permits the electrolyte an exit from the interior to the exterior. The electrolyte is thereby released far from the electrodes and can therefore not ignite at the electrodes. Finally it has been recognized that thermally active or passive cooling means can protect the cells from overheating by means of a cooling function.

It was thereby also recognized that cold cells can be warmed by means of active or passive heating means in order to raise them to a suitable operating temperature. Consequently the problem stated initially is solved.

The cooling means can be implemented as cooling channels. Fluids can be guided through channels for the purpose of cooling. The channels could be implemented as pipes that run orthogonal to the sealing surfaces and/or parallel to the sealing surfaces. Pipes are mechanically particularly stable.

With this background in mind, the cooling means can be implemented as cooling coils. Cooling coils can be put into arbitrary shapes and run circumferentially even along the corners of the sealing frame or extend beyond the corners of the sealing frame. Preferably the cooling coils are integrated into the sealing frame.

The heating means can be implemented as heating wires. Heat can thereby be generated very quickly in order to prevent a disadvantageous cooling-down of the battery to temperatures below 0° C.

In the opening a porous element could be disposed. The porous element can advantageously follow the volume extension of the cells and establish in each state of extension a thermal contact between itself and the cells.

The porous element could be implemented as a fleece or fleece material or feature non-woven fabrics and/or non-woven materials. A fleece or non woven fabric can be deployed without problem in view of its porosity and exhibits a high elasticity and flexibility. In particular it is conceivable that several layers of non-woven fabric or non-woven materials are deployed in order to receive phase-changing materials sandwich-like between the layers.

The porous element could be implemented as foam. The porous element could be implemented as thermally conductive. As a result heat can be removed from the cells or an improved heat transfer onto the cell surface can occur.

With this background in mind the porous element could be equipped to be thermally conducting by means of a coating. A coating can produce a large-area cover of the element. A relatively large thermal contact area is created hereby.

With this background in mind the coating can feature metal, carbon black, or ceramic. These materials are economical and feature a high thermal conductivity.

The porous element could feature thermally conductive fibers. In this context it is conceivable to use carbonized fibers since these feature a high thermal conductivity and can be distributed in a fleece without a problem.

The porous element could be provided with at least one metal foil. In this context it is conceivable that metal foils are disposed on one or both sides on the porous element. Metal foils produce a high thermal conductivity.

The porous element could be glued in with the sealing frame. Glue is readily processed.

The porous element could be connected by means of vulcanization with the sealing frame. Vulcanization produces a particularly strong connection of the porous element with the sealing frame.

The porous element could be clamped in the sealing frame. As a result the porous element can be quickly set and mounted.

The porous element could be laid into the sealing frame. In this specific implementation the edges of the porous element are overlapped by the sealing frame.

The porous element could be welded onto the sealing frame. By means of this specific implementation the porous element will be connected permanently with the sealing frame and can only be released subject to destruction.

The porous element could contain phase-changing materials which execute a phase transition from a solid phase to a liquid phase within a first temperature range. Phase changing material, namely called "Phase Change Materials" can effect a temperature buffering. These materials require no additional sensor or measurement device in order to change their phase, but react material-specific. The phase change should thereby occur in the optimal operating state of the battery, namely in the range of 10° C. to 35° C. Thereby it is assured that the battery, during operation, does not leave this optimum state.

Alternatively a phase-changing material could be deployed that changes its state of phase at higher temperatures, namely in the range of 30 to 50° C. This has the advantage that an overheating of the battery can be buffered.

Alternatively a phase-changing material could be deployed that changes its state of phase at lower temperatures, namely in the range of 0° C. to 15° C. This has the advantage that a damaging cooling off of the battery can be delayed.

With this background in mind it is conceivable to only deploy phase-changing material (PCM). A battery can be kept thereby in an optimal state or a damaging overheating can be prevented. In addition a damaging cooling-off can be prevented. Provided that two phase-changing materials are deployed, one can assure that a battery is not too hot and not too cold.

The porous element could contain first phase-changing materials which execute a phase transition from a solid phase to a liquid phase within a first temperature range, whereby the porous element contains second phase-changing materials, which execute a phase transition from a solid phase to a liquid phase within a second temperature range. Phase changing material, namely called "Phase Change Materials", can effect a temperature buffering. These materials require no additional sensor or measurement device in order to change their phase, but react material-specific. By means of this specific implementation the first phase-changing material can buffer at a relatively low temperature and the second phase-changing material can buffer at a relatively high temperature. The buffering at low temperatures prevents for the most part a damaging strong cooling-off. The buffering at high temperatures improves the safety by buffering local temperature spikes.

The porous element could contain phase-changing materials which execute a phase transition from a solid phase to a liquid phase within a temperature range of 0° C. to 50° C. Particularly advantageous are phase-changing materials that buffer a temperature range of 10° C. to 40° C.

The phase-changing materials could comprise organic materials or exclusively of organic materials. These phase-changing materials are light and do not have a corrosive effect.

The phase-changing materials could comprise inorganic materials or exclusively of inorganic materials. These phase-changing materials are not flammable and feature an improved thermal conductivity.

Into the porous element additional heating means could be integrated. The porous element could contain heating elements. These could be implemented as heating wires. Furthermore it could be conceivable that a foil equipped with heating wires is disposed on the porous element. This arrangement permits active heating and therefore again a counteraction to the damaging cooling-off of the battery.

The phase-changing materials can be encapsulated. By means of this specific implementation a loss of the phase-changing material is prevented. In addition a possible contamination of the cells or the battery is thereby counteracted.

For the purposes of simple manufacture the base body can be made from an elastic compressible material. With this background in mind it is specifically conceivable that the base body is integrally manufactured from an elastic material such as silicone, silicone rubber, SBR or EPDM. Since the seal is usually not exposed to direct contact with the medium, other elastomers such as NBR are also conceivable. The utilization of silicone permits an additional overlap of the seal over the electrodes. In the context of the utilization of carbon-based rubber one cannot completely exclude the possibility that the high voltages in the electrode conductors lead to a carbonization of the elastomer surface and therefore to a loss of the isolating effect.

The overlap permits the mechanical fixing of the electrodes and supports the stability of their making contact.

The first sealing surface and/or the second sealing surface can be implemented as an elastically compressible coating, as an elastomeric inlaid part, as an elastomeric profile or as a seal trace, in particular, as a circumferentially running or partially circumferentially running seal that is disposed on an inelastic support body. A very stable sealing frame can be constructed hereby which nonetheless is implemented elastically compressible at the critical locations, namely the sealing surfaces. With this background in mind it is specifically conceivable that the inelastic support body is sandwich-like enclosed between the elastically compressible layers. A one-side disposition of an elastically compressible layer on the inelastic support body is also conceivable. The inelastic support body could be manufactured from a thermo-plastic plastic material, a thermoset plastic or a metal. The advantages of a thermoset-plastic are its low weight and the low costs. Furthermore a plastic is not electrically conductive. Metals conduct well thermally and can therefore be utilized for cooling. In this context the metal should be enclosed completely encapsulated by the elastically compressible layers particularly in the area of the electrode discharge plates. By means of the utilization of thermally conductive plastics, for example carbon fibers containing thermoplastic, the thermal conductivity of the plastics and therefore the heat transfer can be significantly improved.

Alternative materials are closed-cell foams or compound materials that, in the case of sufficient mechanical stability, have the advantage compared to "solid" materials of lower density and thereby make a lower total weight of the battery possible.

Finally it is conceivable that the base body is manufactured as a two-component part using injection molding technology. A quick manufacture is attainable hereby. The seal can be disposed onto the support by means of vulcanization, spray on, inlay, or gluing. The sealing frame could feature a support body made of aluminum onto which a sealing trace made of silicone-rubber is disposed.

With this background in mind it is conceivable to implement the sealing frame thermally conductive. The sealing frame could be manufactured from polyamide 6 that is filled with carbon fibers. A seal of silicone-rubber could be disposed onto the sealing frame. A circumferentially running seal made from EPDM could be applied to the sealing frame made from polyamide 6, which is filled with carbon fibers, whereby the EPDM contains carbon black as a filling material for improvement of the thermal conductivity. The sealing frame could consist of elastomer solid, namely EPDM, which contains carbon black as a filling material for improvement of the thermal conductivity.

In the first sealing surface and/or the second sealing surface a depression can be implemented. The sealing seam of a Coffee-Bag cell can be in contact with the atmosphere through the depression. With this background in mind it is conceivable that a depression is implemented in a sealing surface or in both sealing surfaces. Provided that two sealing surfaces lie next to one another, the depressions add to one another to yield an enlarged recess through which the seal seam can maintain a contact with the atmosphere. The recess, in cross section, can thereby be implemented arch-shaped, semi-circular, or rectangular. The arch-shaped or semicircular implementation permits an abutment against the sealing seam without contact pressure. A control release location is thereby achieved through which the electrolyte can be released into the environment.

The depression should be disposed at a distance from the electrodes. Instead of the depression one could contemplate realizing a seal with a low contact pressure on the sealing seam in a local area. This can be implemented by means of a locally applied elastomeric material which exhibits a higher elasticity than the elastomeric material of the sealing surface. Hereby it is assured that, under normal operating conditions, an entry of moisture from the outside around the sealing seam is prevented. In case of a failure in which the release of the electrolyte becomes necessary, this overpressure is sufficient to extend the locally weakened seal. Such a desired weakened section can be achieved through the use of a softer elastomer, a locally reduced contact pressure or by means of a locally varying arrangement. Alternatively, it could be covered by a thin foil.

The base body can exhibit bore holes. By means of bore holes different sealing frames that are disposed next to each other can be connected with one another. With this background in mind it is also conceivable that two sealing frames are connected in the sense of a tongue and groove connection.

In this context it is specifically conceivable that blind holes or bore holes are disposed in a base body, said holes receive pins of a further sealing frame.

The bore holes can be implemented in straps that extend from the base body. The straps permit on the one hand to grab hold of the sealing frame without a problem and, on the other hand, that the sealing surfaces are not weakened or reduced by the bore holes. Furthermore they permit a strictly parallel arrangement of the cells that are disposed next to each other.

The base body can be provided with an adhesive. With this background in mind it is specifically conceivable that an adhesive strip is disposed on the base body. By means of an adhesive or an adhesive strip two sealing frames can be glued to one another or the sealing frame can be glued onto the sealing seam. A quick and process-secure build-up of the stacks is thereby possible.

A cooling installation can be integrated into the sealing frame. The sealing frames can thereby be utilized in larger batteries for which a cooling of the cells is required. With this background in mind it is specifically conceivable that the cooling installation is implemented as a metal body that is enclosed sandwich-like between two elastically compressible layers. The elastic sealing of the sealing seam can then be utilized, in other areas, for an additional sealing of the cooling circulation, whereby the heat transfer from the cell to the cooling installation preferably occurs via the sealing seams which abut the metal bodies. The metal body should thereby be received encapsulated and completely enclosed by the layers, particularly in the area of the electrode discharge plates. Other implementation of the cooling installation encompass a lacquer that conducts heat especially well, a heat conducting thermoplastic, or a heat conducting elastomer. The cooling installation could encompass thermally conductive elastomers that are in contact with an outer cooling circulation or cooling fins. This implementation represents a passive cooling.

In the case of active cooling, cooling channels could be installed in or between the elastic sealing frames, through said channels a cooling medium flows. The cooling medium can thereby flow through several sealing frames that have been combined into one stack and thereby control the temperature of several cells. The cells are hereby reliably coolable and their temperature can be homogeneously controlled.

Alternatively separate thermally conductive pipes can be guided through cooling channels, through said pipes the cooling medium flows. Hereby it is assured that the cooling medium cannot come into material contact with the cell surface.

A battery can encompass at least two sealing frames of the type described here and at least a cell, whereby the cell is positioned between two sealing frames, whereby the cell features a thickened section that extends into the openings of their base body and whereby the cell features a tapered section to which the sealing surfaces abut in a sealing manner. The tapered section corresponds to the sealing seam. Through such an arrangement of the cells their break-off points, which are disposed in the tapered section, can be sandwich-like surrounded by two sealing frames. Such a battery according to the invention is suitable for mobile applications, particularly in vehicles and airplanes as well as for stationary applications, for example for systems that require an uninterrupted supply of electricity.

With this background in mind the sealing surfaces can receive the tapered section sandwich-like in at least a section between them and can abut to one another tightly. Specifically it is conceivable that the sealing surfaces enclose sandwich-like the tapered section in a zone that faces the opening and lie directly next to each in a zone that is facing away from the opening. In the upper zone, which is facing away from the opening, the sealing surfaces lie next to one another in a sealing manner and seal off the interior of the cells against damaging media.

Between the sealing frames discharge plates of the electrodes of the cells can be incorporated that protrude beyond the sealing frames.

The sealing frames abut tightly against the discharge plates so that no damaging media can enter from outside to the inside or from the inside to the outside. The discharge plates project thereby beyond the sealing frame so that contact can be made with them without effort.

Between the sealing frames at least one sensor can be disposed that measures pressures. By means of such a sensor, in particular a pressure sensor, inflating cells can be detected without effort. Inflating cells represent a typical phenomenon for damaged cells.

The cells can be implemented as Coffee-bag cells with a sealing seam, whereby the tapered section of the cells is implemented as a sealing seam. Coffee-bag cells distinguish themselves through a high capacity per construction volume.

Specifically, Coffee-Bag cells feature a flexible cell housing. Rather the cell housing is a foil into which the interior of the cells is welded, analogous to coffee in a coffee package. This foil can be implemented as a metal foil that is coated on both sides. This technology makes the manufacture of thinner cells and larger design flexibility possible. Additional advantages are the higher energy density, which is a result of the compact construction, and lower manufacturing costs. The flexibility of the design makes the cells particularly attractive for the mobile phone and computer market.

With this background in mind, the cell is implemented as a lithium ion cell.

Beyond that the cell could be implemented as a lithium-polymer cell for which instead of a liquid electrolyte a polymer matrix is used that absorbs the electrolyte almost completely and fixates it almost completely leak-safe.

At the battery a blow-off hood can be disposed. Hereby it can be assured that released gases or electrolytes are safely drained away. The blow-off hood can be made of metal, plastics or an elastomer and has to be sealed off against the sealing frame. The blow-off hood can cover in process several depressions that are disposed next to each other. The blow-off hood could, as the case may be, be equipped with a foil or a burst-membrane so that it keeps moisture away from the sealing seam of the Coffee-Bag cell under normal conditions. The blow-off hood can then, for example, be connected with the environment via a hose or a pipe. Into this hose or in the pipe can additionally be a valve disposed which opens from the inside only in the case of imminent overpressure. With this arrangement, it would be assured that, in the event of a blow-off of the electrolyte during a failure of the battery, said electrolyte would be removed securely and in a directed manner from the interior of the battery, particularly away from the electrodes.

The battery can feature an additional fixed fixing frame. The additional fixed fixing frame could be manufactured from plastics or from metals that are coated with non-conductive materials. This fixed frame additionally makes sure that the sealing points are subject to a constant and even contact pressure. Furthermore a fixed frame makes possible an improved and secure mounting of the stacks of cells, which are equipped with the sealing frames, in the housing of the battery. In addition facilitates such an arrangement the maintenance and the exchange of damaged cells.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a rectangular sealing frame;

FIG. 1a is a view of a rectangular sealing frame onto which a seal was applied;

FIG. 1b is an additional view of a rectangular sealing frame onto which a seal with a gap was applied;

FIG. 1c is a partial view of a cell which is incorporated between two sealing frames according to the FIG. 1a;

FIG. 1d is a perspective view of a rectangular sealing frame in which cooling channels are implemented;

FIG. 2 is a perspective view of two abutting sealing frames;

FIG. 3 is a lateral view of two abutting sealing frames;

FIG. 4 is a sealing frame that encompasses a rigid support body on one side of which an elastically compressible layer is disposed;

FIG. 5 is a sealing frame in the case of which elastically compressible layers are applied on both sides a rigid support body;

FIG. 6 is a sealing frame, in case of which the porous element contains heating wires for electric heating;

FIG. 7 is a plan view of a Coffee-Bag cell from which electrodes protrude;

FIG. 7a is a lateral view of the Coffee-Bag cell;

FIG. 11 is a cell with flexible sleeve in the "Coffee Bag Design" which is integrated via the circumferentially running sealing seam in a sealing frame in a positively locking manner, and to the left a plan view of the cell and the sealing frame;

FIG. 11a is a cross-sectional view of the sealing frame of FIG. 11;

FIG. 12 is two cells with flexible sleeve in the "Coffee Bag Design" which are integrated via the circumferentially running sealing seam into several sealing frames;

Corresponding reference numerals indicate corresponding parts throughout the several views of the drawings.

DETAILED DESCRIPTION

Figure 8:
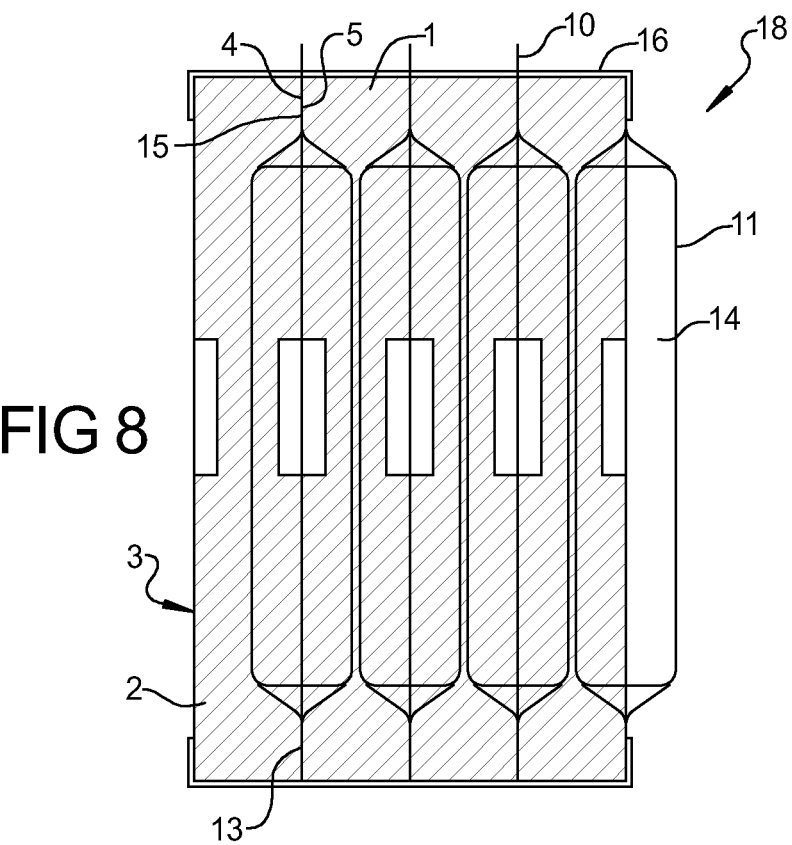
FIG. 8 is a schematic view of a stack of individual Coffee-bag cells between which sealing frames are disposed, whereby the sealing frames are pressed against one another in a positively locking manner by a fixing frame.

Example embodiments will now be described more fully with reference to the accompanying drawings.

FIG. 1 presents a sealing frame 1 for utilization in a battery, encompassing a base body 2, whereby the base body 2 encloses an opening 3, whereby the base body 2 features a first sealing surface 4 and an oppositely positioned second sealing surface 5. The first sealing surface 4 and the second sealing surface 5 are elastically compressible implemented. The base body 2 is implemented rectangular and features four arms which surround the opening 3 and are connected to one another. The first sealing surface 4 is oriented parallel to the second sealing surface 5, whereby both sealing surfaces 4, 5 align with the opening 3.

The base body 2 is manufactured from an elastically compressible material. In the first sealing surface 4 and the second sealing surface 5 a depression 6 is implemented respectively which is, in its cross section, implemented arch-shaped.

FIG. 1a presents an additional sealing frame 1 onto which a circumferentially running seal 4a is disposed.

FIG. 1b presents a sealing frame onto which a partially circumferentially running seal 4b is disposed. The partially circumferentially running seal 4b is interrupted by a gap 4c.

FIG. 1c presents a partial view of a cell 11 which is incorporated between two sealing frames 1 according to FIG. 1a or FIG. 1b.

FIG. 1d presents a perspective view of a sealing frame 1 into which a cooling installation is integrated that encompasses cooling channels.

FIG. 2 presents two sealing frames 1 implemented according to FIG. 1 that are disposed abutting one another, in a perspective view. From the base body 2, straps 7 protrude in which bore holes can be disposed. By means of the bore holes the sealing frames 1 can be fixed with one another with the aid of screws. A constant and sufficiently high contact pressure can hereby be assured across the entire base body 2 of the sealing frame 1.

FIG. 3 presents a second view of two abutting sealing frames 1 according to FIG. 2, whereby two arch-shaped depressions 6 add up to a control release location for an electrolyte.

FIG. 4 presents a sealing frame 1 with a base body in the context of which the second sealing surface 5 is implemented as an elastically compressible layer that is disposed on an inelastic support body 8.

FIG. 5 presents a sealing frame 1 in the context of which the first sealing surface 4 and the second sealing surface 5 are each implemented as elastically compressible layers. The layers are applied to both sides of an inelastic support body 8. The support bodies 8 are sandwich-like enclosed by the compressible layers.

FIG. 6 presents a sealing frame 1 with a porous, compressible element 20, namely a compensating element. The element 20 contains as heating means 23 heating wires for electric heating. The heating wires 23 can thereby be integrated in a separate heating foil, which is disposed on the element 20.

FIG. 7 presents a cell 11 that is implemented as a Coffee-Bag cell. FIG. 7A is a plan view of the cell 11. The interior of the cell 11, namely the electrode/separator staple, is located in the cell housing 12, which consists of a coated metal. Very specifically, aluminum is provided with a polyolefin coating. Typical widths and lengths of the cell housing 12 of cells 11, which are utilized in electro-vehicles, are typically more than 20 cm. Such cell housings 12 are about 1 cm thick. The cell housing 12 features a circumferentially running approximately 1 cm wide sealing seam 13 at which two coated metals, namely the foils, are tightly laminated together. The typical thickness of the sealing seam 13 is about 1 to 2 mm. The discharge plates 10 of the electrodes protrude from sealing seam 13. The discharge plates 10 are made of metal are usually less than 1 mm thick. FIG. 7A is a lateral view of the cell 11.

FIG. 8 presents a stack of several cells 11, which are spaced from one another in the area of the sealing seam 13. The sealing seams 13 are pressed together by means of the sealing frames 1. A sealing frame 1 encompasses the cell 11 thereby. The discharge plates 10 of the electrodes protrude from the sealing frames 1. The sealing seams 1 protrude beyond the sealing frames 13.

A sealing against moisture from the atmosphere results hereby since two neighboring sealing frames 1 immediately abut against one another in the zone that protrudes beyond the sealing seams 13. It is also conceivable that the sealing frames 1 could be engaged with one another in an interlocking manner. Preferably buffer distances are implemented between neighboring cells 11, said buffers being sufficiently covered by the sealing frames 1. Hereby it can be assured that, in the event of maximal thickness of the cells 11, no additional pressure is exerted on the sealing seams 13.

This figure presents specifically also a battery 18, encompassing at least two sealing frames 1 and at least a cell 11, whereby a cell 11 is positioned between two sealing frames 1, whereby the cell 11 features a thickened section 14 that extends into the openings 3 of the base body of the sealing frames 1 and whereby the cell 11 features a tapered section 15 to which the sealing surfaces 4, 5 abut in a sealing manner. The sealing surfaces 4, 5 incorporate the tapered section 15 sandwich-like in a section between them and, beyond that, abut to one another tightly. The tapered section 15 is implemented as a sealing seam 13. The thickened section 14 encloses the interior of the cell 11, namely the electrode/separator staple. Between the sealing frames 1 discharge plates 10 of the electrodes of the cells are incorporated that protrude beyond the sealing frames 1. The sealing frames 1 are placed through a fixing frame 16 that presses the sealing frames 1 against one another. In this context it is to be assured that the surface pressure on the sealing frames 1 is approximately constant.

Figure 9:
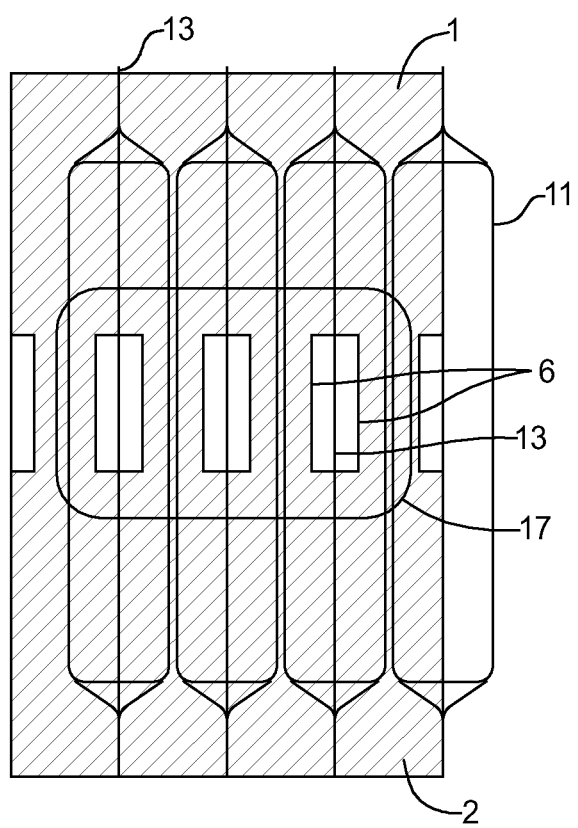
FIG. 9 is two abutting sealing frames with depressions that are implemented arch-shaped in cross section, as well as a schematic view of a blow-off hood which is installed above the depressions and is connected with the sealing frames in a positively locking manner.

FIG. 9 presents two abutting sealing frames 1 whose depressions 6 add up to a control release location. The sealing seam 13 is thereby in contact with the atmosphere. Two arch-shaped depressions 6 add up to a complete hole. Hereby a control release location is achieved that does not abut against the sealing seam 13 with pressure and thereby permits leaking electrolyte a path to the outside.

The depressions 6 should be disposed as far away as possible from the discharge plates 10 of the electrodes. Above the depressions 6 of the sealing frames 1a blow-off hood 17 is disposed that is in form closure with the sealing frame 1. The blow-off hood 17 permits a secure removal of the electrolyte gases that are being emitted from the depressions 6.

Figure 10:
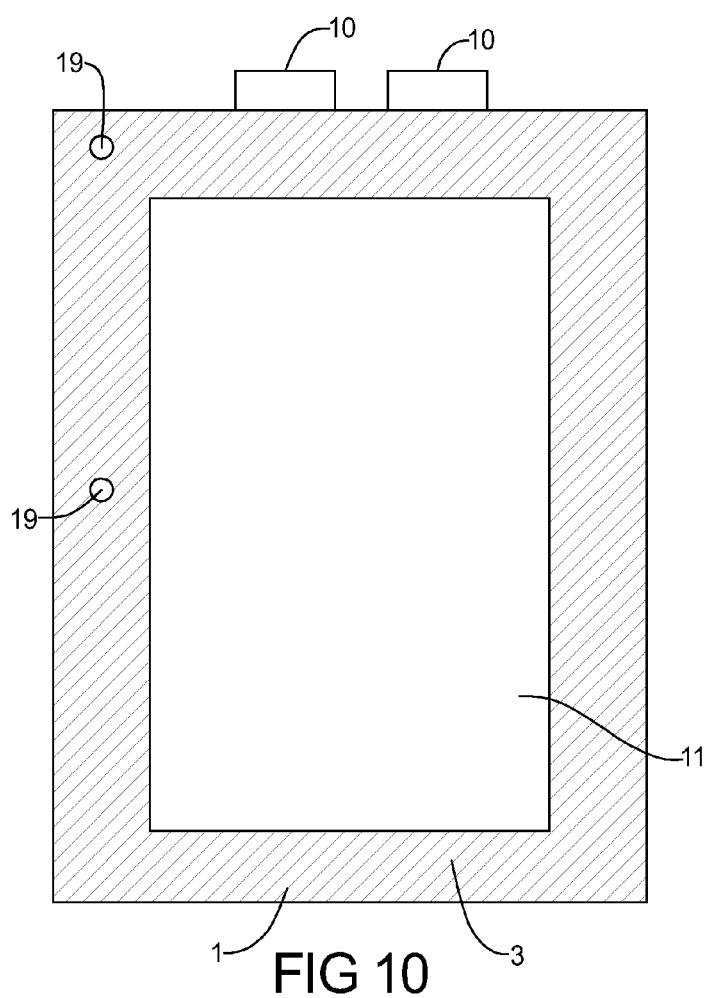
FIG. 10 is a sealing frame with an integrated cooling installation.
Figure 10A:
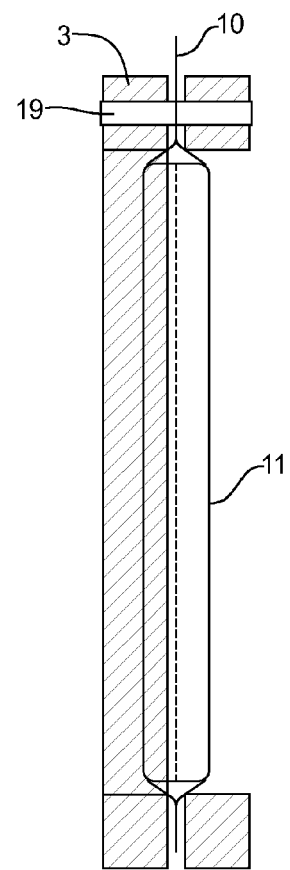
FIG. 10a is a cross-sectional view of the sealing frame of FIG. 10.

FIG. 10 presents a plan view of a sealing frame according to FIG. 1. In the base body 2 a cooling installation 19, in this implementation with pipe-shaped cooling channels, is integrated. The sealing frame 1 is implemented thermally conductive in this implementation. A sandwich-construction, as was described in FIGS. 4 and 5, is here also conceivable. FIG. 10 is a lateral view of the left arrangement.

FIG. 11 presents on the right a cell 11 with flexible sleeve in the "Coffee Bag Design" which is integrated at its circumferentially running sealing seam 13 between two sealing frames 1. The discharge plates 10 of the electrodes thereby protrude beyond the sealing frames 1.

Against the cell 11 abuts a flexible and reversibly compressible, porous element 20, which is in direct thermal contact with the sealing frame 1 and the cell 11. The flexible porous element 20 can be completely thermally conductive, on both its surfaces that face the cells 11, or also only on one surface facing the cell 11. The porous element 11 can be implemented as a fleece into which thermally buffering phase-changing materials, so-called "phase change materials", are incorporated.

In the sealing frame 1a cooling installation 19 is implemented, which encompasses cooling channels. The cooling channels are orthogonally oriented to the sealing surfaces 4, 5.

The cooling channels can control the temperature of the material, from which the sealing frame 1 is manufactured, and therefore the cell 11. This can be accomplished by means of a direct contact of the sealing seam 13 and indirectly by means of a surface contact of the cells 11.

FIG. 11A is a plan view presented of the sealing frames 1, the cell 11 as well as the porous element 20. Parallel sealing frames 1 can be tightly connected with one another. This can be accomplished by means of schematically represented screws 21, clamps or similar.

FIG. 12 presents an arrangement according to FIG. 11, whereby two cells 11 are represented between three sealing frames 1. The cooling channels of the sealing frames 1 align with one another in such a manner that a single continuous cooling channel is formed.

Figure 13:
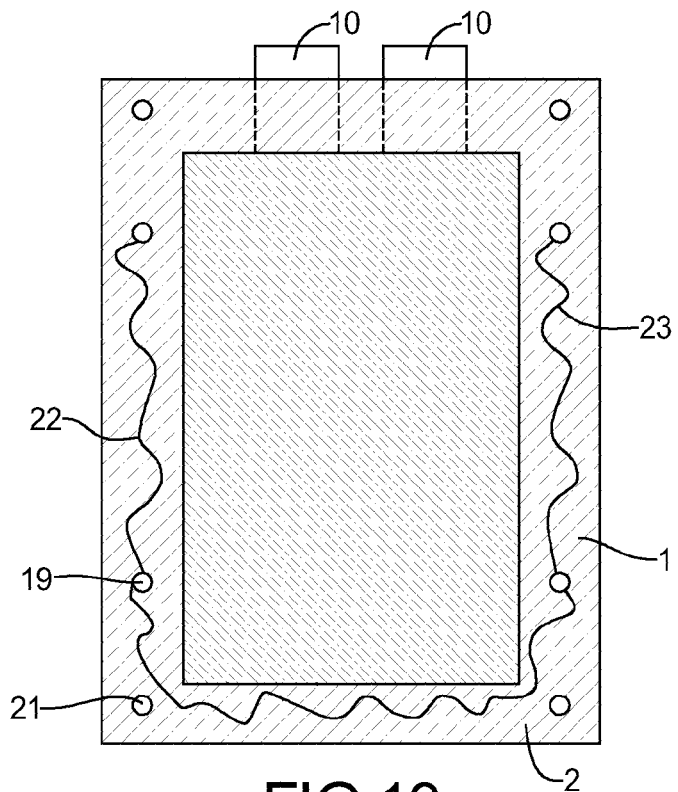
FIG. 13 is a sealing frame that features heating means and/or cooling means that permit a quick temperature adjustment of the sealing frame and therefore of a cell.

FIG. 13 presents a sealing frame 1 in which, besides the cooling channels that are oriented orthogonally to the sealing surfaces 4, 5, additional cooling means 22 and/or heating means 23 are integrated that extend along the sealing surfaces 4, 5. The cooling means 22 and/or heating means 23 penetrate the base body 2 at least partially along the lengthwise extension of the sealing surfaces 4, 5. The cooling means 22 are implemented as cooling coils. The cooling coils connect the orthogonally oriented cooling channels of the cooling installation 19 in a fluid-guiding manner. The heating means 23 are implemented as heating wires and only represented schematically.

Figure 14A:
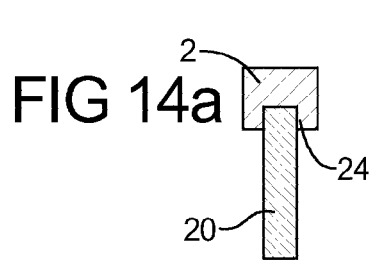
FIGS. 14a-14c are schematic views of different attachment possibilities of a porous element at the sealing frame.
Figure 14B:
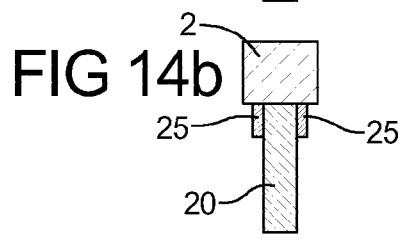
Figure 14C:
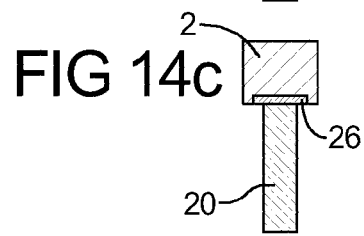
Figure 14:
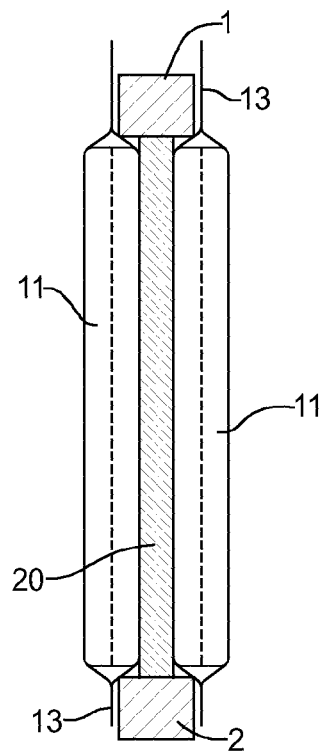
FIG. 14 is a schematic view of a porous element that is positioned between two cells.

FIG. 14 presents a cross-sectional view of the porous element 20 incorporated into the frame 1. FIG. 14A presents a porous element 20 which is incorporated in a recess 24 in the base body 2. FIG. 14B presents a porous element 20 which is fixed by means of attachment straps 25 to the base body 2. FIG. 14C presents in the left lower view a porous element 20 which is fixed to the base body 2 by means of an adhesive layer 26.

Figures 15A, 15B, 15C:
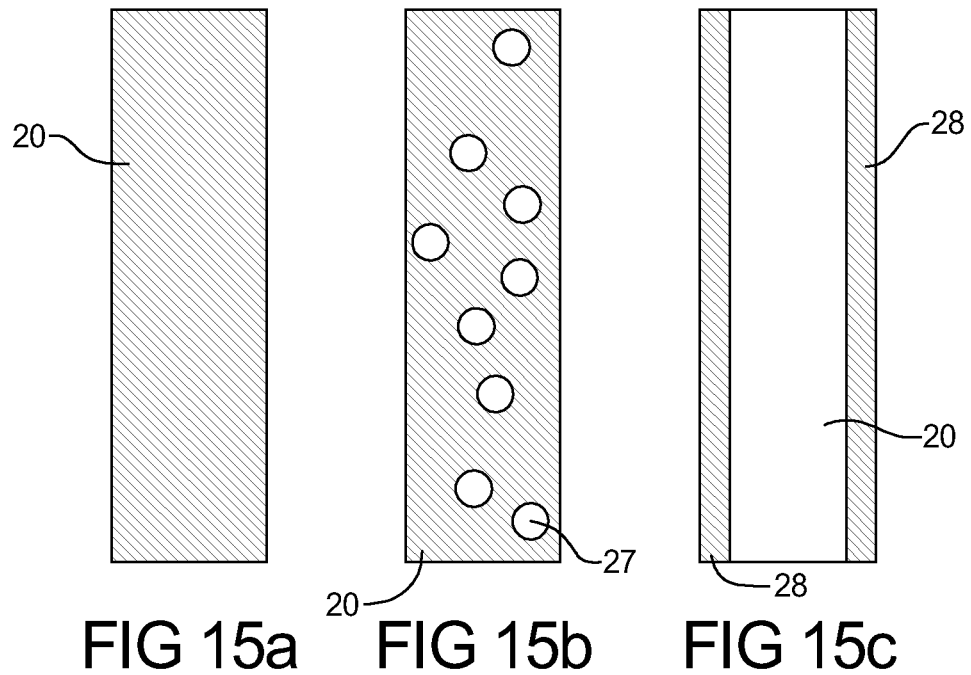
FIG. 15a is a thermally completely conductive porous element.
FIG. 15b is a porous element that features phase-changing materials.
FIG. 15c is a porous element for which on the surfaces close to the cells are thermally conductive.

FIG. 15A presents a porous element 20 that is thermally completely conductive. FIG. 15B presents a porous element 20 into which phase-changing materials 27 have been incorporated. FIG. 15C presents a porous element 20 that features on both sides coatings 28 that are thermally conductive. The coating 28 can also be only applied on one side. The coating 28 can be implemented as a metal foil.

Figure 16:
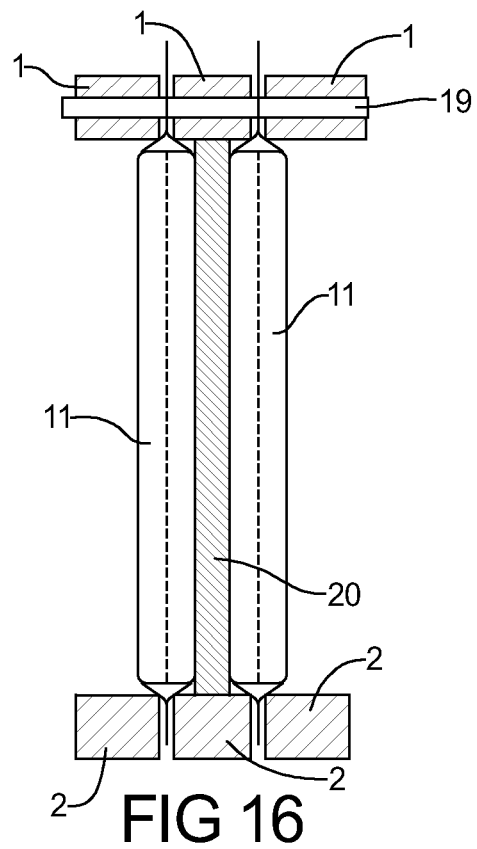
FIG. 16 is a porous element that is positioned between two cells and attached to a sealing frame.

FIG. 16 presents the arrangement of two cells 11 that incorporate between them a porous element 20 that abuts against the cells 11.

The porous element 20 can be implemented as a fleece or fleece material or contain several fleeces or fleece materials. In this context the following fleeces and combinations of treated or untreated fleeces are realizable.

a) A fleece of the type FS 22345 (Polyester-wet-fleece) which is coated on both sides with aluminum. A fleece made from polyester is advantageous because it is chemically resistant to the electrolyte of a battery leaking in the event of a failure.

b) A fleece of the type FS 22345 (Polyester-wet-fleece) which is coated on both sides with an aluminum-foil.

c) A fleece of the type FS 22345 (Polyester-wet-fleece) which is coated with conducting carbon black.

d) A fleece of the type FS 22345 (Polyester-wet-fleece) which is coated with thermally conducting aluminum oxide.

e) A fleece of the type T1700-186 (Freudenberg Fuel Cell Component Technology) made from graphite fibers.

f) A metal fleece material.

The porous element 20 implemented as a fleece or encompassing fleece or fleece materials could feature phase-changing materials 27.

In this context the following modifications are realizable:

g) A fleece of the type FS 22345 (Polyester-wet-fleece) is coated with RUBITHERRM RT 25 (Paraffin; melting point 26° C.; melting enthalpy 232 kJ/kg; amount=100 g/m$^2$), which is fixed with a binder h) Between two layers of a fleece of the type FS 22345 (Polyester-wet-fleece) RUBITHERRM RT 25 in the amount of 100 g/m$^2$ is inserted, which is fixed with a binder.

The modification according to g) and h) can be implemented analogously with amounts of 500 g/m2.

i) Between two layers of a fleece of the type FS 22345 (Polyester-wet-fleece) RUBITHERRM RT 5 (Paraffin; melting point 9° C.; melting enthalpy 205 kJ/kg; amount=100 g/m$^2$) is inserted, which is fixed with a binder.

j) Between two layers of a fleece of the type FS 22345 (Polyester-wet-fleece) CLIMSEL S 32 of the company Climator (salt hydrate; melting point 32° C.; melting enthalpy 212 kJ/kg; amount=100 g/m$^2$) is inserted, which is fixed with a binder.

k) Between two layers of a fleece of the type FS 22345 (Polyester-wet-fleece) CLIMSEL S 48 of the company Climator (salt hydrate; melting point 48° C.; melting enthalpy 227 kJ/kg; amount=100 g/m$^2$) is inserted, which is fixed with a binder.

l) Between two layers of a fleece of the type FS 22345 (Polyester-wet-fleece) 36 S of the company PCM Energy P. Ltd (salt hydrate; melting point 36° C.; melting enthalpy 260 kJ/kg; amount=100 g/m$^2$) is inserted, which is fixed with a binder.

m) Between two layers of a fleece of the type FS 22345 (Polyester-wet-fleece) are each 50 g/m$^2$ of both phase-changing materials RUBITHERRM RT 5 (Paraffin; melting point 9° C.; melting enthalpy 205 kJ/kg; amount=48° C./m$^2$) and CLIMSEL S 48 of the company Climator (salt hydrate; melting point 48° C.; melting enthalpy 227 kJ/kg; amount=100 g/m$^2$) inserted, which are fixed with a binder.

n) Two layers of a fleece of the type FS 22345 (Polyester-wet-fleece) are, besides phase-changing materials 27, also coated with conducting carbon black in the amount of each 50 g/m$^2$.

o) A fleece with phase-changing materials 27 according to modification j) is, after being equipped with the phase-changing materials, coated with aluminum such that it is conductive, preferably by means of a CVD process.

p) Onto both sides of a fleece with phase-changing materials 27 according to modification j) is, after it being equipped with the phase-changing material, a foil made of aluminum glued.

All previously mentioned phase-changing materials 27 are encapsulated.

In the following table data are provided that quantify the effectiveness of the cooling:

|  | Electrode-cooling | Sealing seam cooling | Surface-cooling |
| --- | --- | --- | --- |
| Effective cross section-area | 2 * 50 * 0.2 mm$^2$ = 20 mm$^2$ | 2 * 1000 * 5 mm$^2$ = 10.000 mm$^2$ | 2 * 200 * 300 mm$^2$ = 120.000 |
| Heat transfer-coefficient | x | 0.1 x | 0.01 x |
| Product cross section* Heat transfer-coefficient | 20 x | 1.000 x | 1.200 x |
| Cooling efficiency (Electrode-cooling = 1) | 1 | 50 | 60 |
| Heating possible | No | Yes | Yes |

The technology described here permits cooling or temperature control of a cell 11 by means of the sealing seam 13 as well as also by means of the area of the cell 11. The effectiveness of the temperature control is increased hereby.

In the following list are phase-changing materials 27 presented that are commercially available.

| PCM name | Type of product | Melting temperature (° C.) | Heat of fusion (kJ/kg) | Density (kg/m$^3$) | Source |
| --- | --- | --- | --- | --- | --- |
| SN33 | Salt solution | −33 | 245 | 1.24 | Cristopia [41] |
| TH-31 | n/a | −31 | 131 | n/a | TEAP [42] |
| SN29 | Salt solution | −29 | 233 | 1.15 | Cristopia [41] |
| SN26 | Salt solution | −26 | 268 | 1.21 | Cristopia [41] |
| TH-21 | n/a | −21 | 222 | n/a | TEAP [42] |
| SN21 | Salt solution | −21 | 240 | 1.12 | Cristopia [41] |
| STL-21 | Salt solution | −21 | 240 | 1.12 | Mitsubishi Chemical [43] |
| SN18 | Salt solution | −18 | 268 | 1.21 | Cristopia [41] |
| TH-16 | n/a | −16 | 289 | n/a | TEAP [42] |
| STL-16 | n/a | −16 | n/a | n/a | Mitsubishi Chemical [43] |
| SN15 | Salt solution | −15 | 311 | 1.02 | Cristopia [41] |
| SN12 | Salt solution | −12 | 306 | 1.06 | Cristopia [41] |
| STLN10 | Salt solution | −11 | 271 | 1.05 | Mitsubishi Chemical [43] |
| SN10 | Salt solution | −11 | 310 | 1.11 | Cristopia [41] |

-continued

| PCM name | Type of product | Melting temperature (° C.) | Heat of fusion (kJ/kg) | Density (kg/m³) | Source |
|---|---|---|---|---|---|
| TH-10 | n/a | −10 | 283 | n/a | TEAP [42] |
| STL-6 | Salt solution | −6 | 284 | 1.07 | Mitsubishi Chemical [43] |
| SN06 | Salt solution | −6 | 284 | 1.07 | Cristopia [41] |
| TH-4 | n/a | −4 | 286 | n/a | TEAP [42] |
| STL-3 | Salt solution | −3 | 328 | 1.01 | Mitsubishi Chemical [43] |
| SN03 | Salt solution | −3 | 328 | 1.01 | Cristopia [41] |
| ClimSel C 7 | n/a | 7 | 130 | n/a | Climator [44] |
| RT5 | Paraffin | 9 | 205 | n/a | Rubitherm GmbH [45] |
| ClimSel C 15 | n/a | 15 | 130 | n/a | Climator [44] |
| ClimSel C 23 | Salt hydrate | 23 | 148 | 1.48 | Climator [44] |
| RT25 | Paraffin | 26 | 232 | | Rubitherm GmbH [45] |
| STL27 | Salt hydrate | 27 | 213 | 1.09 | Mitsubishi Chemical [43] |
| S27 | Salt hydrate | 27 | 207 | 1.47 | Cristopia [41] |
| RT30 | Paraffin | 28 | 206 | n/a | Rubitherm GmbH [45] |
| TH29 | Salt hydrate | 29 | 188 | n/a | TEAP [42] |
| ClimSel C 32 | Salt hydrate | 32 | 212 | 1.45 | Climator [44] |
| RT40 | Paraffin | 43 | 181 | n/a | Rubitherm GmbH [45] |
| STL47 | Salt hydrate | 47 | 221 | 1.34 | Mitsubishi Chemical [43] |
| ClimSel C 48 | n/a | 48 | 227 | 1.36 | Climator [44] |
| STL52 | Salt hydrate | 52 | 201 | 1.3 | Mitsubishi Chemical [43] |
| RT50 | Paraffin | 54 | 195 | n/a | Rubitherm GmbH [45] |
| STL55 | Salt hydrate | 55 | 242 | 1.29 | Mitsubishi Chemical [43] |
| TH58 | n/a | 58 | 226 | n/a | TEAP [42] |
| ClimSel C 58 | n/a | 58 | 259 | 1.46 | Climator [44] |

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A sealing frame (1) for utilization in a battery having a plurality of cells, comprising:
  a base body (2) having an opening (3), whereby the base body (2) includes a first sealing surface (4) and a facing second sealing surface (5) and wherein at least one of the first sealing surface (4) and the second sealing surface (5) are elastically compressible,
  wherein cooling means (22) are integrated in the base body (2) and which penetrate the base body (2) at least partially along the lengthwise expansion of the sealing surfaces (4, 5); and
  a porous and compressible element disposed in the opening in said base body and external to the plurality of cells and between adjacent ones of the plurality of cells.

2. The sealing frame according to claim 1, wherein the cooling means (22) is implemented as cooling channels.

3. The sealing frame according to claim 1, wherein the cooling means (22) is implemented as cooling coils.

4. The sealing frame according to claim 1, wherein the porous element (20) includes at least one of fleece, nonwoven, and foam materials.

5. The sealing frame according to claim 1, wherein the porous element (20) is thermally conductive.

6. The sealing frame according to claim 1, wherein the porous element (20) is equipped to be thermally conductive by means of a coating (28).

7. The sealing frame according to claim 6, wherein the coating (28) includes at least one of metal, carbon black, and ceramic.

8. The sealing frame according to claim 1, wherein the porous element (20) includes thermally conductive fibers.

9. The sealing frame according to claim 1, wherein the porous element (20) is equipped with at least one metal foil.

10. The sealing frame according to claim 1, wherein the porous element (20) is glued together with the sealing frame (1).

11. The sealing frame according to claim 1, wherein the porous element (20) is joined with the sealing frame (1) by means of vulcanization.

12. The sealing frame according to claim 1, wherein the porous element (20) is clamped in the sealing frame (1).

13. The sealing frame according to claim 1, wherein the porous element (20) contains first phase-changing materials (27) which execute a phase transition from a solid phase to a liquid phase within a first temperature range, whereby the porous element (20) contains second phase-changing materials (27), which execute a phase transition from a solid phase to a liquid phase within a second temperature range different than said first temperature range.

14. The sealing frame according to claim 13, wherein the phase-changing materials (27) include organic materials.

15. The sealing frame according to claim 13, wherein the phase-changing materials (27) include inorganic materials.

16. The sealing frame according to claim 13, wherein the phase-changing materials (27) are encapsulated.

17. The sealing frame according to claim 1, wherein the porous element (20) contains phase-changing materials (27) which execute a phase transition from a solid phase to a liquid phase within a temperature range of 10° C. to 40° C.

18. The sealing frame according to claim 1, wherein the porous element (20) is integrated with heating means (23).

19. The sealing frame according to claim 18, wherein the heating means (23) is implemented as at least one of heating wires and heating foils.

20. The sealing frame according to claim 1, wherein the base body (2) is made from elastically compressible material.

21. The sealing frame according to claim 1, wherein at least one of the first sealing surface (4) and the second sealing surface (5) are implemented as an elastically compressible layer that is disposed on an inelastic support body (8).

22. The sealing frame according to claim 1, wherein a depression is formed in at least one of the first sealing surface (4) and the second sealing surface (5).

23. The sealing frame according to claim 1, wherein a local area of heightened elasticity is provided in at least one of the first sealing surface (4) and the second sealing surface (5).

24. The sealing frame according to claim 1, wherein bore holes are implemented in straps (7) that protrude from the base body (2).

25. The sealing frame according to claim 1, wherein the base body (2) is provided with an adhesive.

* * * * *